G. H. GRIFF.
WHIFFLETREE HOOK.
APPLICATION FILED SEPT. 24, 1914.

1,125,308.

Patented Jan. 19, 1915.

George H. Griff
INVENTOR.

WITNESSES:
BY
ATTORNEYS.

UNITED STATES PATENT OFFICE.

GEORGE H. GRIFF, OF CHICAGO, ILLINOIS.

WHIFFLETREE-HOOK.

1,125,308.             Specification of Letters Patent.         Patented Jan. 19, 1915.

Application filed September 24, 1914. Serial No. 863,326.

*To all whom it may concern:*

Be it known that I, GEORGE H. GRIFF, a citizen of the United States, residing at Chicago, in the county of Cook and State of Illinois, have invented certain new and useful Improvements in Whiffletree-Hooks, of which the following is a specification.

This invention relates to hooks for making the connection of the traces of a harness with the whiffletree, and its object is to provide a simple, efficient and strong hook of this kind, together with an improved guard for the hook whereby the traces are prevented from being accidentally disconnected, said guard being easily manipulated to connect or disconnect the traces.

With these objects in view, the invention consists in a combination and arrangement of parts to be hereinafter described and claimed, reference being had to the accompanying drawing, in which—

Figure 1:
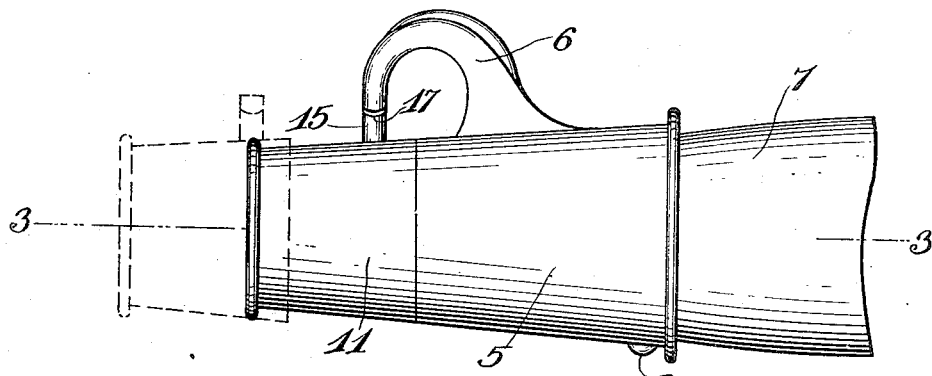
Figure 2:
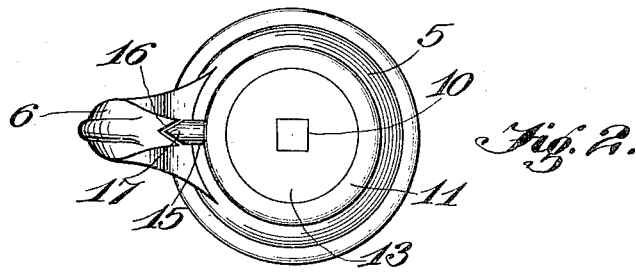
Figure 3:
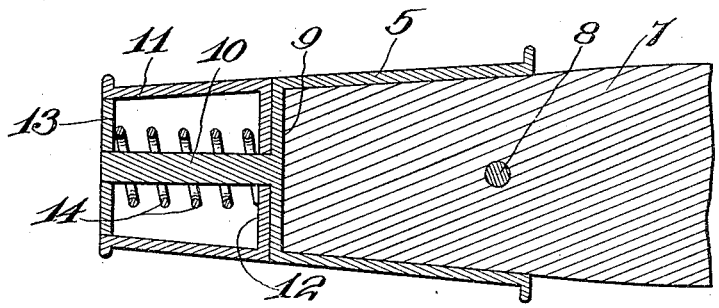

Figure 1 is a plan view of the device; Fig. 2 is an end view thereof, and Fig. 3 is a longitudinal section on the line 3—3 of Fig. 1.

Referring specifically to the drawing, 5 denotes a ferrule having a hook 6 on one side, the hook being preferably formed integral with the ferrule. The inner end of the ferrule is open so that it may be slipped over the end of the whiffletree 7 to which latter it is made fast by a cross pin 8.

The outer end of the ferrule 5 is closed, as indicated at 9, and from said end extends a stem 10 which is angular in cross section. On this stem is slidably mounted a sleeve 11, the inner end of which is closed, as indicated at 12, and normally seats on the outer end 9 of the ferrule. As the stem is angular in cross-section, the sleeve is prevented from rotating thereon, it being however free to slide. The outer end of the stem carries an abutment 13 in the shape of a disk of such diameter as to seat in the outer end of the sleeve, flush therewith. A spring 14 is coiled around the stem, between the abutment 13 and the inner closed end 12 of the sleeve.

The sleeve 11 carries a guard 15 for the hook 6, said guard being in the shape of a finger which projects outward from the side of the sleeve so as to extend to the tip of the bill of the hook, said tip having a groove 16. The tip of the guard finger is beveled, as indicated at 17 to seat in the groove 16.

The hook 6 extends from the ferrule 5 and terminates in a curve toward the side of the sleeve 11, from which latter the tip or extremity of the hook is spaced, and across which space the guard finger 15 normally extends, thus closing up the hook and preventing the trace ring held by said hook from accidentally slipping off the same. The finger is held in this position by the spring 14. To apply or remove the trace ring from the hook, it is necessary only to pull the sleeve outward, as shown dotted in Fig. 1, which takes the guard finger away from the hook and leaves the same open. The disk 13 closes the outer end of the sleeve 11, and the spring 14 is therefore completely housed and protected. As the engagement and disengagement of the guard finger is effected by a longitudinal sliding movement of the sleeve, and not by a turning movement, the liability of breakage of the spring is reduced to a minimum.

The device is easy to operate and its construction also enables it to be used at either end of the whiffletree.

I claim:

1. A whiffletree hook comprising a ferrule, a hook extending therefrom, a stem projecting from the outer end of the ferrule, a sleeve slidably and non-rotatably mounted on the stem, said sleeve being slidable outward from the end of the ferrule, the tip of the aforesaid hook pointing toward the side of the sleeve and being spaced therefrom, a guard finger projecting from the side of the sleeve and extending to the tip of the hook, and a spring restraining movement of the sleeve in a direction outward from the end of the ferrule to carry the guard finger away from the tip of the hook.

2. A whiffletree hook comprising a ferrule which is closed at its outer end, a hook extending from the ferrule, a stem projecting from the outer end of the ferrule, a sleeve slidably and non-rotatably mounted on the stem, said sleeve being slidable outward from the end of the ferrule, the inner end of the sleeve being closed and seating against the outer end of the ferrule, and the tip of the aforesaid hook pointing toward the side of the sleeve and being spaced therefrom, a guard finger projecting from the side of the sleeve and extending to the tip of the hook, an abutment on the outer end of the stem, said abutment closing the outer end of the sleeve, and a spring in the sleeve between its closed inner end and the abutment.

3. A whiffletree hook comprising a ferrule, a hook extending therefrom, a stem projecting from the outer end of the ferrule, a sleeve slidably and non-rotatably mounted on the stem, said sleeve being slidable outward from the end of the ferrule, the tip of the aforesaid hook pointing toward the side of the sleeve and being spaced therefrom, a guard finger projecting from the side of the sleeve and extending to the tip of the hook, said tip of the hook having a groove and the tip of the guard finger having a bevel to seat in said groove, and a spring restraining movement of the sleeve in a direction outward from the end of the ferrule to carry the guard finger away from the tip of the hook.

In testimony whereof I affix my signature in presence of two witnesses.

GEORGE H. GRIFF.

Witnesses:
S. J. LEHRER,
H. G. BATCHELOR.

Copies of this patent may be obtained for five cents each, by addressing the "Commissioner of Patents, Washington, D. C."